(12) United States Patent
Kohno et al.

(10) Patent No.: US 6,694,811 B2
(45) Date of Patent: Feb. 24, 2004

(54) FLOW METER HAVING AIRFLOW SENSOR

(75) Inventors: Yasushi Kohno, Nagoya (JP); Toshimasa Yamamoto, Bisai (JP); Hiroyuki Wado, Toyota (JP); Tetsuo Yoshioka, Okazaki (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/379,938

(22) Filed: Mar. 6, 2003

(65) Prior Publication Data
US 2003/0172731 A1 Sep. 18, 2003

(30) Foreign Application Priority Data

Mar. 14, 2002 (JP) ........................................ 2002-070567

(51) Int. Cl.[7] ................................................ G01F 1/68
(52) U.S. Cl. ................................................ 73/204.22
(58) Field of Search ......................... 73/204.22, 118.2, 73/204.23, 204.24

(56) References Cited

U.S. PATENT DOCUMENTS

| 4,457,169 A | 7/1984 | Lauterbach et al. |
|---|---|---|
| 4,981,035 A | 1/1991 | Hall |
| 5,404,753 A | 4/1995 | Hecht et al. |
| 5,925,820 A * | 7/1999 | Tank et al. ............ 73/118.2 |
| 6,085,587 A * | 7/2000 | Konzelmann .......... 73/202 |
| 6,336,360 B1 | 1/2002 | Weber |
| 6,422,070 B2 | 7/2002 | Reymann et al. |
| 2001/0049970 A1 | 12/2001 | Kitahara et al. |

FOREIGN PATENT DOCUMENTS

JP          A-02-263117          10/1990

* cited by examiner

*Primary Examiner*—Edward Lefkowitz
*Assistant Examiner*—Jewel V. Thompson
(74) *Attorney, Agent, or Firm*—Nixon & Vanderhye PC

(57) ABSTRACT

A flow meter is formed with a passage for introducing and carrying air to measure and has a sensing part disposed in the passage for measuring a flow rate of the air. A contraction part is formed on an inner surface of the passage so that the contraction part faces the sensing part. The contraction part narrows the flow of the air flowing near the sensing part. A flat surface of the contraction part is formed in parallel with the surface of the sensing part and at least upstream of the sensing part. Thus, collision of particles against the sensing part and adhesion of contaminants to the sensing pert are inhibited. Meanwhile, the flow rate of the air is measured stably and accurately.

19 Claims, 5 Drawing Sheets

FLOW METER HAVING AIRFLOW SENSOR

CROSS REFERENCE TO RELATED APPLICATION

This application is based on and incorporates herein by reference Japanese Patent Application No. 2002-70567 filed on Mar. 14, 2002.

BACKGROUND OF THE INVENTION

1. Field of the Invention

The present invention relates to a flow meter for measuring flow rate of air and in particular to a flow meter applied to an intake air flow meter for an internal combustion engine.

2. Description of Related Art

Conventionally, a flow meter having a membrane airflow sensor is used for measuring a flow rate of intake air of an internal combustion engine. The airflow sensor is disposed in a passage carrying the air to measure.

An air filter is disposed in an intake system of the engine in order to eliminate particles such as sand, which are included in the intake air and have relatively large diameters. However, the intake air also includes particles that have relatively small diameters (hundreds of micrometers, for instance) and are difficult to eliminate with the air filter. In a case where the particles having relatively small diameters enter the passage, a sensing part of the flow meter might be damaged if the particles collide with the sensing part, for instance, at a speed of tens of meters per second. Specifically, if the sensing part is a membrane airflow sensor, the membrane of the airflow sensor is very thin. For instance, the thickness of the membrane is approximately 1 micrometer. Therefore, the membrane will be easily damaged if the particles collide with it.

A flow meter disclosed in U.S. Pat. No. 5,404,753 (DE4219454A1) or U.S. Pat. No. 6,422,070 B2 (DE4407209A1) is formed with a contraction part in an air passage in which a flow meter is disposed. The contraction part narrows the cross-sectional area of the passage gradually in a direction of the flow. The contraction part straightens the flow of the air flowing near a sensing part of the flow meter and carries particles included in the air in parallel with the sensing part, in order to reduce the influence of the particles to the sensing part.

In the above flow meter, the contraction part prevents the collision of the particles against the sensing part to some extent. However, the particles have some weight and inertia. Therefore, there is a possibility that the flow of the particles might not be straightened sufficiently compared with the airflow, depending on the shape of the contraction part. Accordingly, the particles whose flow is not straightened sufficiently might collide with the sensing part and might damage the sensing part.

A flow meter disclosed in U.S. Pat. No. 6,336,360 B1 (JP-A-11-248505) has a sensing part disposed in an air passage formed generally in a sigmoid shape. The air passage is formed with folded portions upstream and downstream of the sensing part in order to deflect the airflow and to inhibit the collision of the particles against the sensing part.

In the above flow meter, the particles bypass the sensing part to some extent, since the air passage has the folded portions. However, the effect of the folded parts is not enough to fully prevent the particles from colliding with the sensing part. As a result, the sensing part might be damaged by the particles, or the detection accuracy might be degraded because of adhesion of contaminants to the sensing part.

SUMMARY OF THE INVENTION

It is therefore an object of the present invention to provide a flow meter that prevents particles from colliding with a sensing part and prevents contaminants from adhering to the sensing part, whereby measuring air flow rate stably and accurately.

According to an aspect of the present invention, a flow meter is formed with a passage for introducing and carrying air to measure, and has a sensing part disposed in the passage. The flow meter is formed with a contraction part for narrowing the flow of the air flowing near the sensing part. The contraction part is formed on the inner surface of the passage so that the contraction part faces the sensing part. The contraction part is formed with a flat surface in parallel with the sensing part and at least upstream of the sensing part.

Since the flat surface of the contraction part is formed at least upstream of the sensing part, the air to measure flows along the flat surface of the contraction part and in parallel with the surface of the sensing part when the airflow enters the passage and flows near the sensing part. Meanwhile, the airflow is favorably straightened. Accordingly, the collision of the particles in acute angles against the sensing part is inhibited. Therefore, impulsive force generated when the particles collide with the sensing part is reduced, and the damage in the sensing part or adhesion of contaminants to the sensing part is inhibited. In addition, the airflow is favorably narrowed near the contraction part. Accordingly, the speed of the airflow is increased and the airflow is stabilized. As a result, the flow rate of the air is measured accurately.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENT (First Embodiment)

Figure 1:
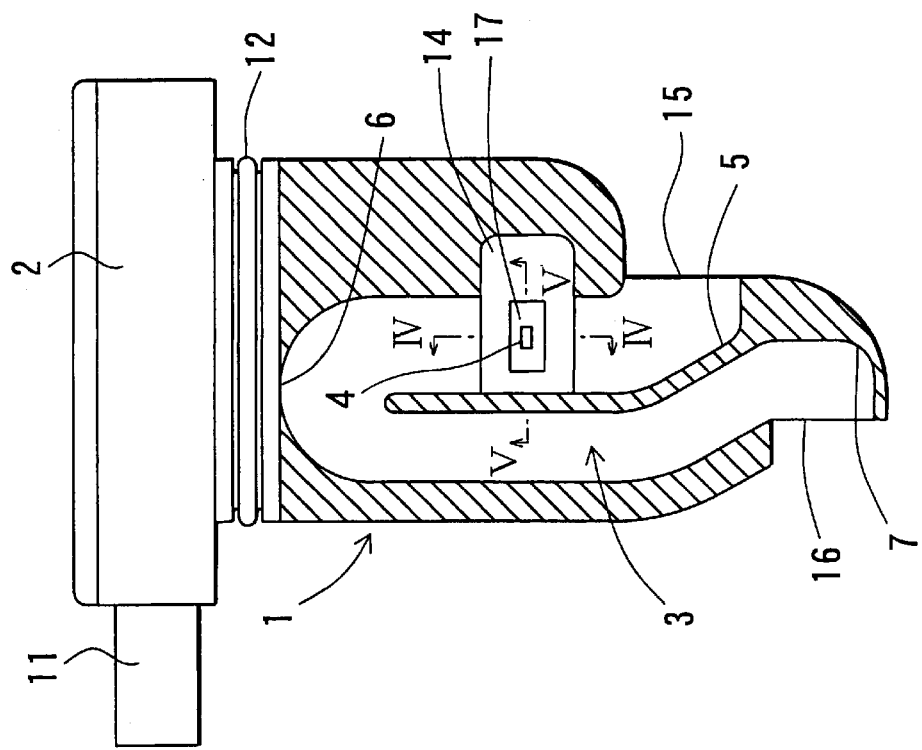
FIG. 1 is a cross-sectional view showing a flow meter according to a first embodiment of the present invention.
Figure 5:
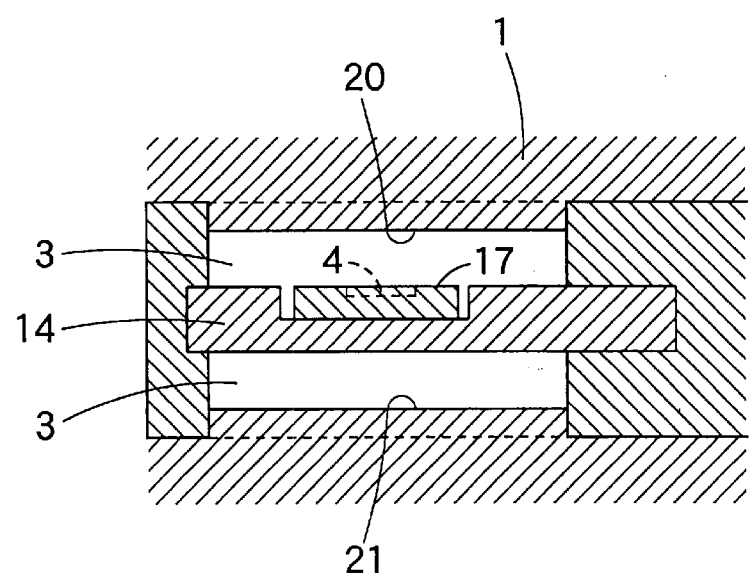
FIG. 5 is a cross-sectional view showing the flow meter along line V—V in FIG. 1 according to the first embodiment.

Referring first to FIG. 1, a flow meter is illustrated. A passage 3 for introducing and carrying air to measure is formed in a main body 1 of the flow meter. The flow meter has a sensing part 4 on a base 14 formed in the passage 3. The sensing part 4 is exposed to the airflow, and measures the flow rate of the air. The passage 3 is a bypass passage for branching and carrying part of the air flowing through an intake pipe 10 of an internal combustion engine and the like. As shown in FIG. 1, the passage 3 is formed generally in the shape of a reversed letter 'U' (or in a sigmoid shape). The cross-section of the passage 3 is formed in a rectangular shape as shown in FIG. 5. An upstream end of the passage 3 in the right side in FIG. 1 provides an inlet 15 and a downstream end thereof in the left side in FIG. 1 provides an outlet 16.

Figure 4:
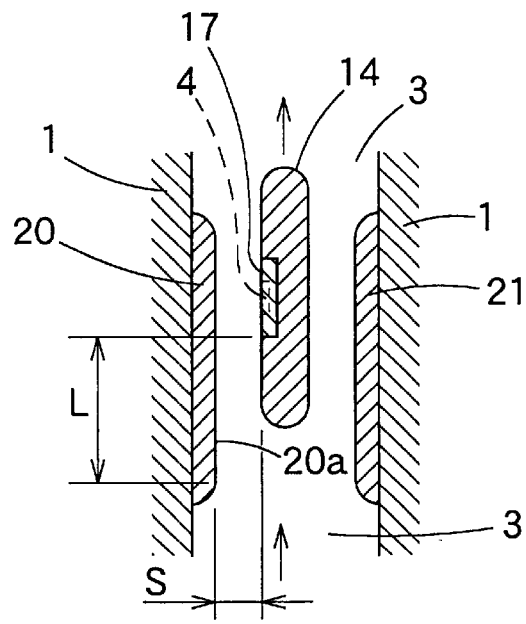
FIG. 4 is a cross-sectional view showing the flow meter along line IV—IV in FIG. 1 according to the first embodiment.

An inlet side bent part 5 is formed in the passage 3 near the inlet 15. On the other hand, an outlet side bent part 7 is formed in the passage 3 near the outlet 16. A middle bent part 6 is formed in the passage 3 at the middle of the passage 3. The base 14 is disposed between the inlet side bent part 5 and middle bent part 6, in the passage 3. The base 14 is formed in the shape of a plate and is disposed so that the base 14 crosses approximately the center of the cross-section of the passage 3. The sensing part 4 and the base 14 are disposed so that the surfaces thereof are parallel to the airflow as shown in FIG. 4. The sensing part 4 is disposed on the base 14 so that the sensing part 4 is exposed to the airflow.

As shown in FIG. 4, a contraction part 20 is formed on the inner surface of the passage 3 so that the contraction part 20 faces the sensing part 4. The contraction part 20 narrows the flow of the air to measure, which flows near the sensing part 4. A flat surface 20a is formed on the contraction part 20 in parallel with the surface of the sensing part 4. The flat surface 20a is formed at least upstream of the sensing part 4. Another contraction part 21 is formed on the inner surface of the passage 3 opposite from the sensing part 4. The contraction part 21 is formed in the same shape and in the same orientation as the contraction part 20. Thus, the contraction parts 20, 21 are disposed symmetrically across the base 14 and the sensing part 4. The contraction parts 20, 21 are protrusions protruding from the inner surface of the passage 3 toward the center of the passage 3 for narrowing the passage area.

A relation between a length L of the flat surface 20a in the upstream of the sensing part 4 in the flow direction and a distance S from the contraction part 20 to the sensing part 4 shown in FIG. 4 is a significant factor for reducing influence of particles to the sensing part 4. Therefore, the relation between the length L and the distance S is specified based on a graph shown in FIG. 6.

Figure 6:
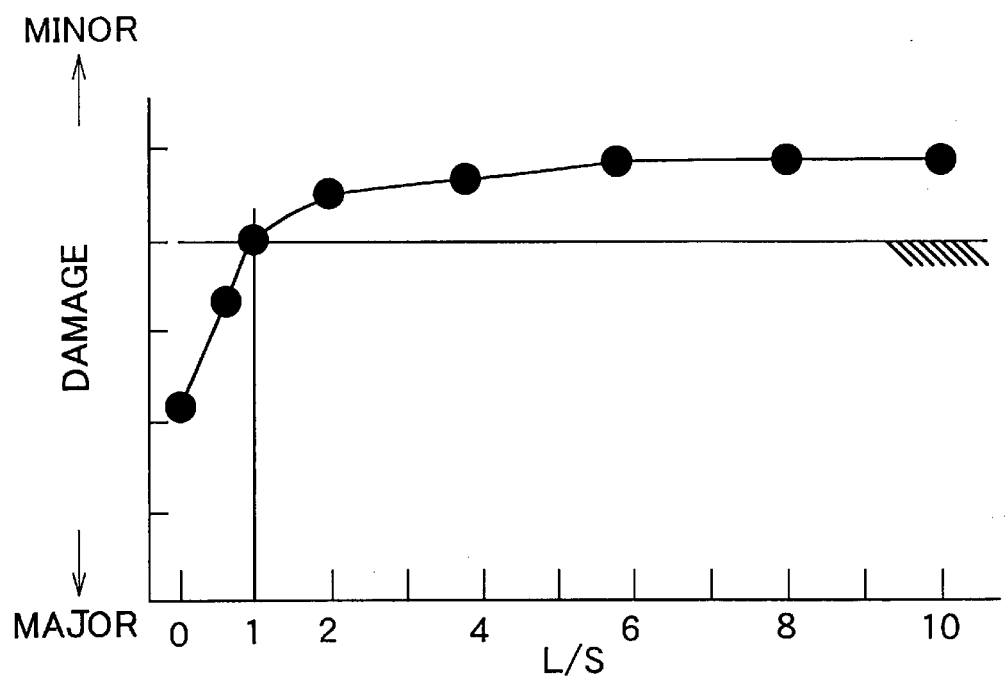
FIG. 6 is a graph showing a relation between a ratio of length L of a flat surface to a distance S and influence of particles to a sensing part according to the first embodiment.

The graph shown in FIG. 6 is based on results of experiment. In the experiment, the degree of the influence, the damage, to the sensing part 4 caused by the particles was measured while changing the ratio (L/S) of the length L to the distance S. Then the results of the experiment were plotted as shown in FIG. 6.

As shown in FIG. 6, the damage to the sensing part 4 caused by the particles is effectively reduced in a range in which the ratio L/S is equal to or more than 1. On the other hand, the influence of the particles increases in a range in which the ratio L/S is less than 1.

Therefore, the relation between the length L and the distance S is set so that the ratio L/S is equal to or more than 1, in order to reduce the influence of the particles to the sensing part 4.

Figure 2:
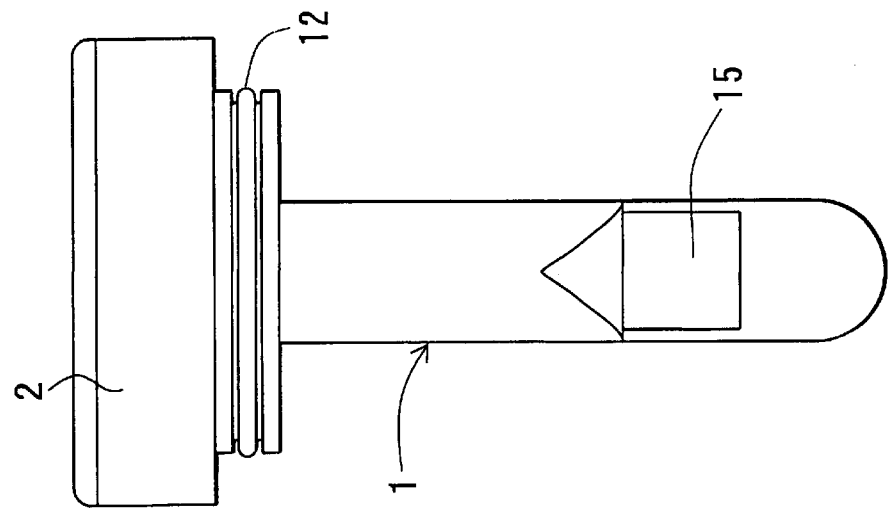
FIG. 2 is an elevation view showing the flow meter according to the first embodiment.

A circuit module 2 is attached to the top of the main body 1 through a sealing member 12 such as an O-ring as shown in FIGS. 1 and 2. A circuit for handling signals is disposed in the circuit module 2. A connector 11 for power source line and signal lines is disposed on the side surface of the circuit module 2.

The main body 1 is made of synthetic resin, such as polybutylene terephthalate (PBT) or poly phenylene sulfide (PPS) including glass fibers.

The sensing part 4 is constructed with a membrane airflow sensor, for instance. The sensing part 4 has a membrane formed on a semiconductor substrate 17, and an intake air temperature detection resistor formed near the membrane. The membrane includes a flow rate detection resistor and an exothermic resistor. The sensing part 4 measures the air flow rate by the use of temperature-resistance characteristics of the resistor. The semiconductor substrate 17 is fixed on a surface of the base 14 and is exposed to the airflow. Terminals on the substrate 17 are connected with the circuit in the circuit module 2 through wire bonding and the like.

Figure 3:
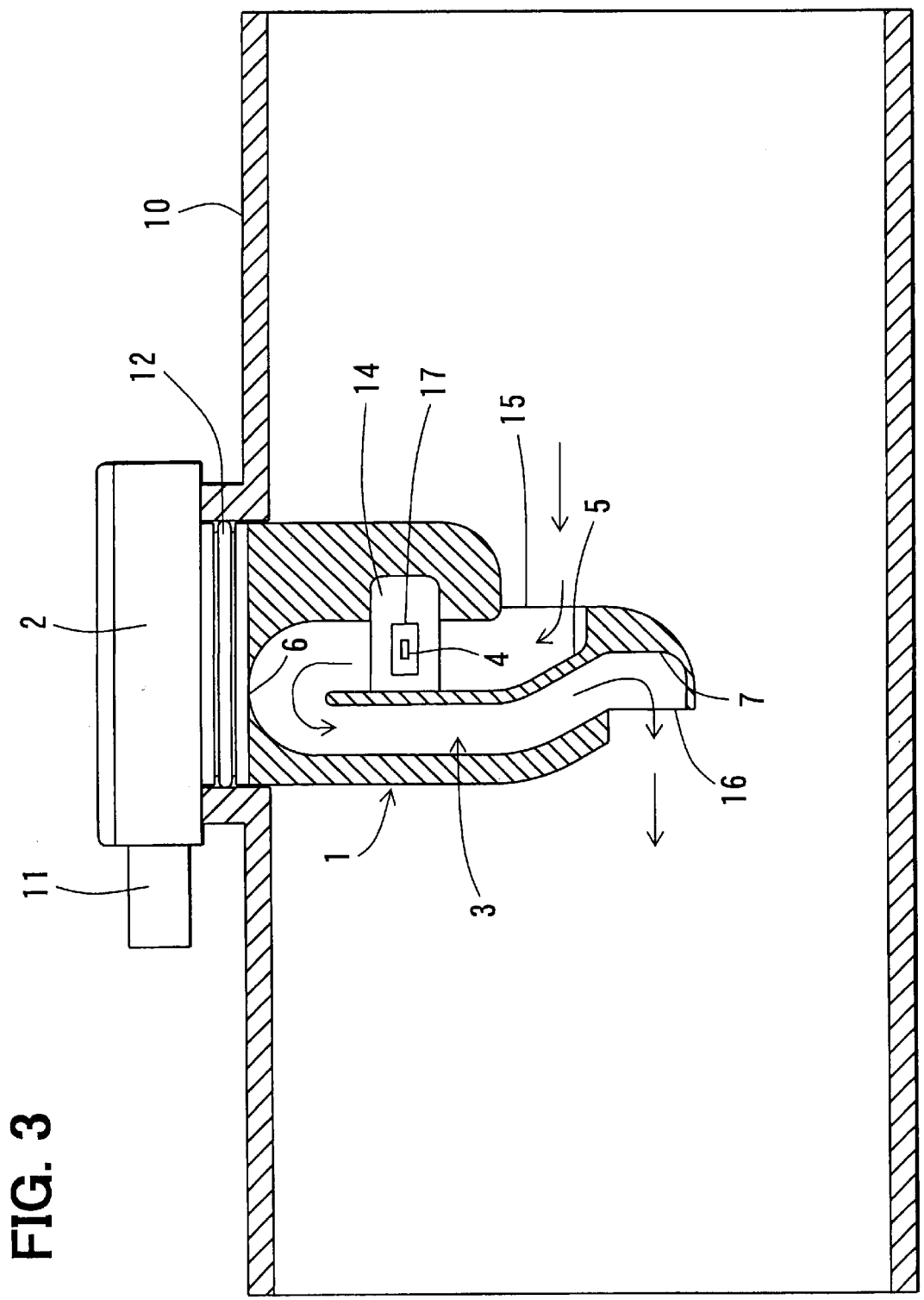
FIG. 3 is a cross-sectional view showing the flow meter attached to an intake pipe according to the first embodiment.

As shown in FIG. 3, the flow meter is mounted by inserting the main body 1 into a hole formed on the intake pipe 10. The flow meter is mounted so that the inlet 15 faces upstream of the airflow and the outlet 16 faces downstream of the airflow. The sealing member 12 seals a gap between the flow meter and the intake pipe.

If the air passes through the intake pipe 10 due to an intake operation of the engine, part of airflow enters the passage 3 through the inlet 15 and passes through the passage 3. At this time, the airflow is narrowed by the contraction parts 20, 21 on both sides near the sensing part 4 as shown in FIG. 4, and goes upward.

The air flowing near the sensing part 4 flows along the contraction parts 20, 21, and meanwhile, the airflow is favorably straightened. Therefore, the particles included in the air flow generally in parallel with the surface of the sensing part 4 along the contraction parts 20, 21, even if the particles have some weight and inertia. Thus, the flow of the particles is straightened and the collision of the particles against the surface of the sensing part 4 in acute angles is greatly inhibited.

As a result, the impulsive force applied to the sensing part 4 when the particles collide with the sensing part 4 is largely reduced, and the damage to the sensing part 4 and the adhesion of the contaminants to the sensing part 4 are inhibited. Furthermore, since the airflow is narrowed near the sensing part 4, the speed of the airflow increases there. As a result, the flow of the air flowing near the sensing part 4 is stabilized and is measured accurately.

(Second Embodiment)

Figure 7:
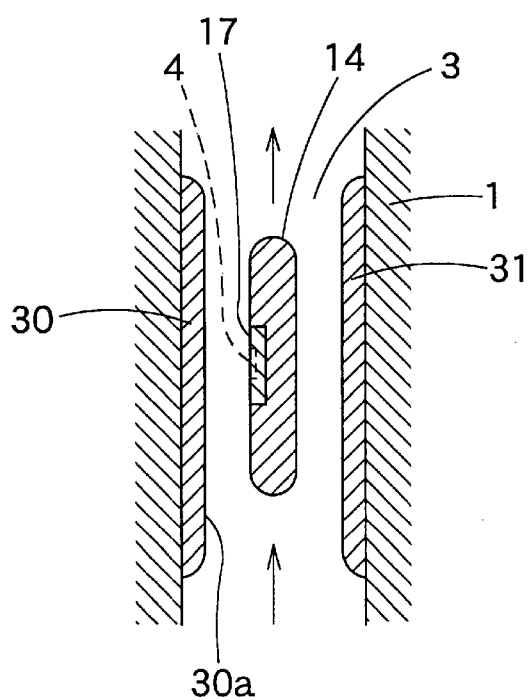
FIG. 7 is a cross-sectional view showing a flow meter according to a second embodiment of the present invention.

The second embodiment of the present invention is illustrated in FIG. 7. As shown in FIG. 7, a contraction part 30 is formed on the inner surface of the passage 3 near the sensing part 4. The contraction part 30 has a flat surface 30a parallel to the surface of the sensing part 4. The flat surface 30a extends longer than the sensing part 4, upstream and downstream of the airflow. Another contraction part 31 is formed on the inner surface of the passage 3 opposite from the sensing part 4. The contraction parts 30, 31 are formed symmetrically with each other.

Since the flat surface 30a extends longer than the sensing part 4 upstream and downstream of the airflow, the airflow is favorably narrowed even if a backflow of the air is generated in the passage 3. As a result, the collision of the particles against the surface of the sensing part 4 in acute angles is greatly inhibited, and the damage to the sensing part 4 is reduced.

(Third Embodiment)

Figure 8:
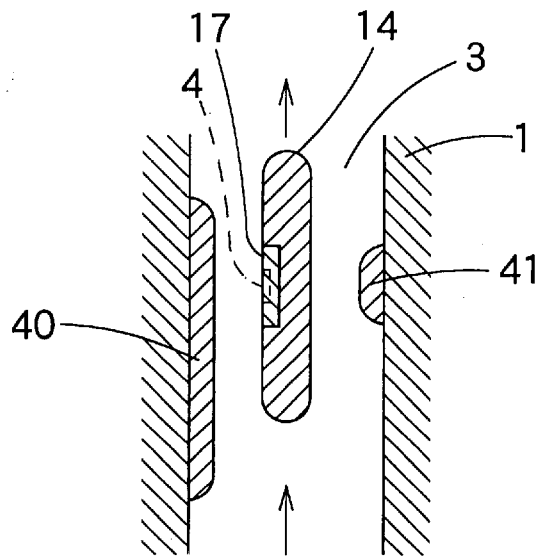
FIG. 8 is a cross-sectional view showing a flow meter according to a third embodiment of the present invention.

The third embodiment of the present invention is illustrated in FIG. 8. As shown in FIG. 8, a contraction part 41 formed opposite from the sensing part 4 is smaller than a contraction part 40 formed in the sensing part 4 side. The airflow and the flow of the particles are suitably straightened near the sensing part 4 even in the case in which the contraction part 41 is formed relatively small as shown in FIG. 8.

(Fourth Embodiment)

Figure 9:
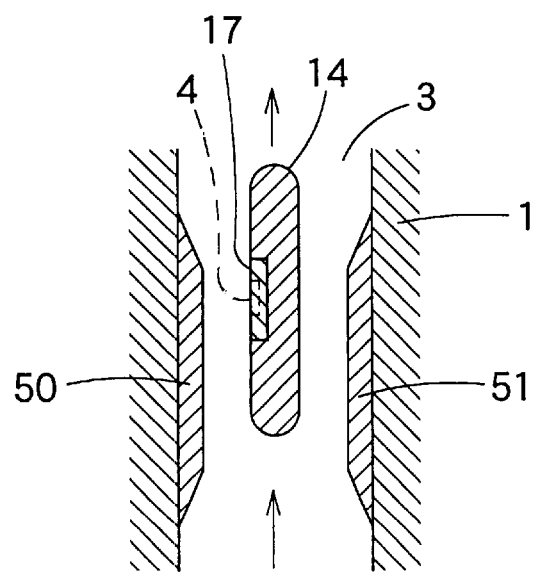
FIG. 9 is a cross-sectional view showing a flow meter according to a fourth embodiment of the present invention.

The fourth embodiment of the present invention is illustrated in FIG. 9. As shown in FIG. 9, contraction parts 50, 51 are formed on the inner surface of the passage 3 respectively, across the sensing part 4. The upstream end and the downstream end of the contraction part 50 are tapered. Likewise, the upstream end and the downstream end of the contraction part 51 are tapered. Thus, increase in air resistance caused by the contraction parts 50, 51 is minimized. As a result, the speed of the air flowing along the contraction parts 50, 51 is maintained high, so that the measuring accuracy of the airflow is improved.

(Effect of the Embodiments)

As explained above, in the flow meter according to the embodiments, when the air to measure enters the passage and passes through the sensing part, the airflow is favorably straightened by the flat surface of the contraction part upstream of the sensing part and flows in parallel with the surface of the sensing part. Therefore, the collision of the particles against the surface of the sensing part in acute angles is inhibited, even if the particles have some weight and inertia. Accordingly, the angle in which the particles collide with the surface of the sensing part becomes obtuse, and the impulsive force applied by the particles to the sensing part decreases. As a result, the damage to the sensing part and the adhesion of the contaminants to the sensing part are inhibited. In addition, the airflow is favorably narrowed at the contraction part near the sensing part and the speed of the airflow is increased. As a result, the airflow near the sensing part is stabilized, and the flow rate of the air is measured accurately.

The present invention should not be limited to the disclosed embodiments, but may be implemented in many other ways without departing from the spirit of the invention.

Conventionally, a flow meter having a membrane airflow sensor is used for measuring a flow rate of intake air of an internal combustion engine. The airflow sensor is disposed in a passage carrying the air to be measured.

What is claimed is:

1. A flow meter that is formed with a passage for introducing and carrying air, which is to be measured, and has a sensing part disposed in the passage for measuring a flow rate of the air, the flow meter comprising:

a contraction part formed on an inner surface of the passage so that the contraction part faces the sensing part and narrows a flow of the air flowing near the sensing part, wherein the contraction part has a flat surface formed in parallel with a surface of the sensing part and at least upstream of the sensing part.

2. The flow meter set forth in claim 1, wherein the contraction part is formed so that a ratio of a length of the flat surface in the upstream of the sensing part in a direction of the flow to a distance between the flat surface of the contraction part and the sensing part is set to be equal to or larger than 1.

3. The flow meter set forth in claim 2, wherein the contraction part is a protrusion protruding from the inner surface of the passage toward a center of the passage for narrowing the area of the passage.

4. The flow meter set forth in claim 2, further comprising an opposite side contraction part formed on the inner surface of the passage opposite from the sensing part.

5. The flow meter set forth in claim 4, wherein the contraction part facing the sensing part and the opposite side contraction part are formed symmetrically across the sensing part.

6. The flow meter set forth in claim 4, wherein the opposite side contraction part is smaller than the contraction part facing the sensing part.

7. The flow meter set forth in claim 2, wherein the flat surface of the contraction part is formed upstream and downstream of the sensing part.

8. The flow meter set forth in claim 2, wherein an upstream end and a downstream end of the contraction part are tapered.

9. The flow meter set forth in claim 1, wherein the passage is a bypass passage for branching and carrying part of air flowing through a main passage.

10. A The flow meter set forth in claim 1, wherein an upstream end of said contraction part is convexly curved.

11. A flow meter that is formed with a passage for introducing and carrying air, which is to be measured, and has a sensing part disposed in the passage for measuring a flow rate of the air, the flow meter comprising:

a contraction part formed on an inner surface of the passage so that the contraction part faces the sensing part and narrows a flow passage of the air flowing near the sensing part, wherein the contraction part is a protrusion, which is formed at least upstream of the sensing part and protrudes from the inner surface of a wall of the passage toward a center of the passage for narrowing the area of the passage, the contraction part having a flat surface formed in parallel with a surface of the sensing part and at least upstream of the sensing part.

12. The flow meter set forth in claim 11, wherein the contraction part is formed so that a ratio of a length of the flat surface in the upstream of the sensing part in a direction of the flow to a distance between the flat surface of the contraction part and the sensing part is set to be equal to or larger than 1.

13. The flow meter set forth in claim 12, further comprising an opposite side contraction part formed on the inner surface of the passage opposite from the sensing part.

14. The flow meter set forth in claim 13, wherein the contraction part facing the sensing part and the opposite side contraction part are formed symmetrically across the sensing part.

15. The flow meter set forth in claim 13, wherein the opposite side contraction part is smaller than the contraction part facing the sensing part.

16. The flow meter set forth in claim 12, wherein the flat surface of the contraction part is formed upstream and downstream of the sensing part.

17. The flow meter set forth in claim 12, wherein an upstream end and a downstream end of the contraction part are tapered.

18. The flow meter set forth in claim 11, wherein the passage is a bypass passage for branching and carrying part of air flowing through a main passage.

19. The flow meter set forth in claim 11, wherein an upstream end of said contraction part is convexly curved.

* * * * *